Sept. 17, 1957 J. U. DALY 2,806,654
THERMOSTATIC CONTROL DEVICE
Filed April 28, 1955
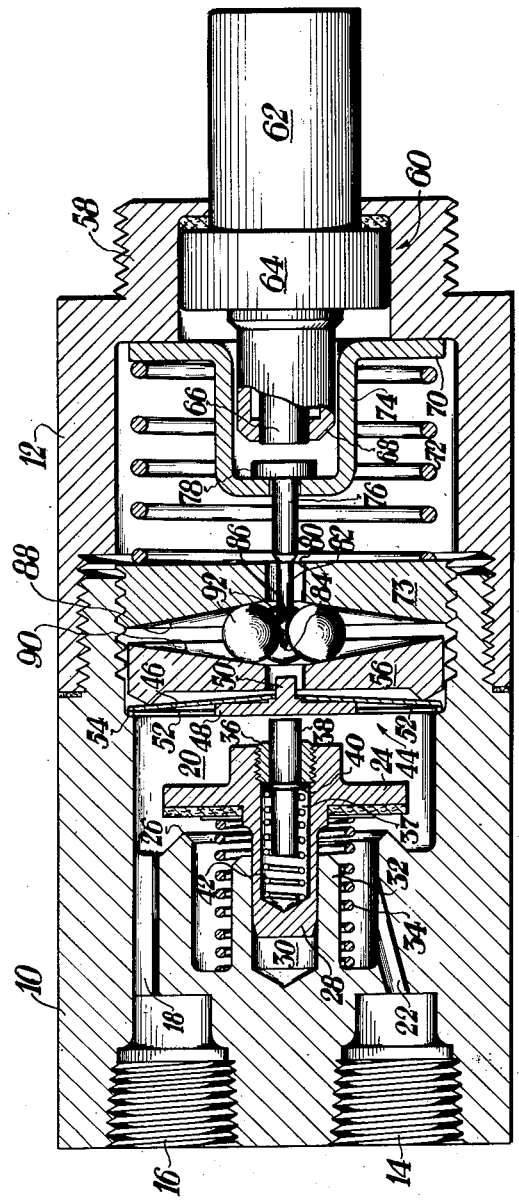
INVENTOR.
JAMES U. DALY
BY
HIS ATTORNEY

2,806,654
THERMOSTATIC CONTROL DEVICE

James U. Daly, Latrobe, Pa., assignor to Robertshaw-Fulton Controls Company, Greensburg, Pa., a corporation of Delaware Application April 28, 1955, Serial No. 504,408

2 Claims. (Cl. 236—99)

This invention relates to fuel control devices for fluid fuel burners and more specifically to fuel control devices including a thermostatically controlled valve.

An object of this invention is to incorporate in a thermostatic control device, a more positive thrust transmitting connection between a thermal element and a valve.

Another object of this invention is to eliminate the use of an override spring.

Another object of this invention is to insure quick opening and quick closing of a valve.

In a preferred embodiment of the invention, a casing is provided with an inlet and an outlet for fluid fuel and snap-action valve means for controlling the flow of fuel between the inlet and outlet. Thermally responsive means including an axially movable member is operatively connected to the valve means by a novel thrust transmitting connection comprising a plurality of elements in operative engagement with said member and movable radially from the axis defined by said axial movement of said member and positioned between two discs having inclined surfaces, one of said discs being movable and operatively engaging said valve means, said elements being adapted to exert a wedging effect upon said one disc to cause movement thereof.

Other objects and advantages will become apparent from the following description taken in connection with the accompanying drawing which is a longitudinal sectional view of a control device embodying this invention.

Referring more particularly to the drawing, the control device comprises a main casing 10 and an end casing 12 suitably threaded on one end of the main casing 10 in axial alignment therewith. The other end of the main casing 10 is provided with an inlet 14 and an outlet 16 for fluid fuel. The inlet 14 communicates by way of a passage 22 with a valve chamber 20 which in turn communicates with the outlet 16 by way of another passage 18.

A valve member 24 is positioned within the valve chamber 20 and is reciprocable into and out of engagement with a valve seat 26, formed on the casing 10 to control the flow of fuel from the inlet 14 to the outlet 16. A tubular end portion 28 of the valve member 24 is slidably received by a bore 30 in an annular boss 32 to maintain alignment of the valve 24 with the valve seat 26. A spring 34 encircles the boss 32 and is mounted in compression between the casing 10 and the valve member 24 to bias the valve member 24 toward an open position as shown.

A bushing 36 is threaded within a bore 37 within the valve 24 to receive a valve stem 38. The valve stem 38 is slidably positioned within a bore in the bushing 36 which maintains axial alignment thereof with the valve member 24. A flange 40 on the valve stem 38 is biased into engagement with the end of the bushing 36 by a spring 42 and limits movement of the valve stem 38 relative to the valve member 24 toward the open end of the bore 37. The spring 42 encircles the valve stem 38 and is mounted in compression between the flange 40 and the end of the bore 37 and is selected to be stronger than the spring 34. Thus, when the valve member 24 is in engagement with the seat 26, the stem 38 may move toward the end of the tubular portion 28 for a purpose which will later be described.

The other end of the valve stem 38 extends from the valve 24 to engage a snap-action mechanism 44, comprising a clicker disc 46, an annular disc 48 constituting a thrust member having a control stud 50 seated in an opening located at the center of the clicker disc 46, and a pair of levers 52, 52 disposed between the disc 46 and the end of the valve stem 38. The levers 52, 52 are suitably pivoted on a shoulder 54 formed on the casing 10. A pusher disc 56, slidably positioned within the central bore of the casing 10, is adapted to engage and actuate the clicker disc 46 to cause over-center snap action thereof.

Should the disc 56 be moved to the left by a means later to be described, over-center snap action of the clicker disc 46 will occur and the assembly of the valve stem 38 and valve 24 will be moved axially with a snap movement which is sufficient to seat the valve member 24 on the valve seat 26. The spring 42 will absorb any shock resulting from the snap-closing of the valve member 24 by permitting the valve stem 38 to move within the bore 37 to cause compression of the spring 42. The device thus far described is well known in the art and further description is deemed unnecessary.

A tubular threaded portion 58 projects from the end casing 12 and enables the end casing 12 to be attached to a water tank or the like containing a fluid which requires thermostatic control. Mounted within the tubular end portion 58 and concentric therewith is a thermostatic actuating device 60 having a temperature sensing element 62 projecting therefrom. The thermostatic actuating device is of conventional form having a relatively fixed end 64, a movable member 66, and an expansible fusible material (not shown) disposed within and in communication with the movable member 66. Any suitable fusible material which will give a large volumetric change on passing from the solid to the liquid state at a predetermined temperature may be used, and since these devices are well known in the art, further description is deemed unnecessary.

The thermostatic actuating device 60 is operatively connected to the snap-action mechanism 44 by a novel thrust transmitting connection, the description of which now follows. The movable member 66 is slidably positioned within a guide 68 and adapted for axial movement therein in response to the hereinbefore described change of state. A movable spring seat 70 is biased into engagement with the end of the end casing 12 by a spring 72 which is mounted in compression between the seat 70 and a disc 73 which is suitably threaded in the end of the main casing 10. The seat 70 is provided with a tubular end portion 74 which encloses the guide 68 and movable member 66.

A stem 76 is slidably received by a bore in the end of the tubular end portion 74 and has one end fixed therein by a flange 78 which engages the inner end of the tubular portion 74 and maintains axial alignment of the stem 76 with the valve stem 38. The flange 78 is adapted to be engaged by the movable member 66 upon change of state of the expansible and fusible material, to be moved axially toward the disc 73 carrying with it the spring seat 70 to compress the spring 72.

The other end of the stem 76 extends from the tubular portion 74 in axial alignment with the valve stem 38 and through a bore 80 in the disc 73. The stem 76 is provided with a section 82 which is diminished in diameter and a section 84 which is further diminished in diameter from the section 82. The sections 82, 84 define a frusto-conical shaped shoulder 86 which provides a cam surface, the purpose of which will later be described.

The disc 73 is provided with a generally conical-shaped surface 88 which faces a corresponding conical-shaped surface 90 formed on the pusher disc 56. The surfaces 88, 90 define an opening between the discs 56, 73 having a generally diamond-shaped cross-section with each of the discs 56, 73 defining an obtuse angle at the center thereof. The pusher disc 56 being in engagement with the snap-action mechanism 44 is effectively biased toward the disc 73 by the spring 34 and snap mechanism 44.

To transmit axial movement of the stem 76 to the pusher disc 56, a plurality of balls 92, in this instance three, are positioned between the discs 56, 73 to be equally spaced around the stem 76 and in operative engagement therewith. The opposed inclined surfaces provided by the conical-shaped surfaces of the discs 56, 73 cooperate with the combined biasing force of the snap-action mechanism and the spring 34 to force the balls 92 into engagement with the section 84 of the stem 76 as shown. The balls 92 are of sufficient diameter so that when in engagement with the section 84, they will be in engagement with each other to maintain equal spacing thereof around the section 84.

Upon axial movement of the stem 76 by the movable member 66, the shoulder 86 of the stem 76 will enter between and engage the balls 92 to cause movement thereof radially from the axis defined by the stem 76 until the balls 92 engage the section 82 of the stem 76. Radial movement of the balls 92 will exert a wedging effect on the discs 56, 73 tending to force separation thereof. Since the disc 73 is fixed to the casing 10, the pusher disc 56 will be moved axially toward the valve member 24 to cause the hereinbefore described over-center snap action of the snap-action mechanism 44 and closing of the valve member 24.

Since the section 82 is of uniform diameter, further movement of the stem 76 after snap action will cause no further movement of the balls 92. Thus, a possible "overshoot" by the thermostatic actuating device 60 will not affect the device.

The shoulder 86 and the inclined surfaces defining the conical-shaped surfaces 88, 90 are of sufficient dimensions to give substantially a 3:1 ratio of movement between the pusher disc 56 and stem 76. Thus, the force exerted by the power element need only be a third of the force necessary to actuate the snap-action mechanism. However, it is to be understood that this ratio may be varied to any desired amount by varying the dimensions of the parts concerned. It is also to be understood that the invention is not limited to use with the particular type of valve structure or to the use of the valve as a controlling member and to use with the particular type of thermally responsive element or to use with a thermally responsive element as an actuating means.

Operation

The inlet 14 and the outlet 16 may be connected by suitable means to a source of fluid fuel and a fluid fuel burner and the casing 10 suitably attached to a water tank or the like requiring thermostatic control.

Should the temperature of the temperature sensing element 62 increase sufficiently to cause the fusible material to pass from a solid to a liquid state, the movable member 66 will be forced to the left into engagement with the stem 76 which in turn will be forced to the left causing engagement of the shoulder 86 with the balls 92. The balls 92 will be moved radially by the shoulder 86 and cause movement of the disc 56 to actuate the snap-action mechanism 44 which in turn moves the valve member 24 to a closed position. When the stem 76 moves sufficiently to cause engagement of the balls 92 with the section 82, any further movement of the stem 76 will not cause further movement of the balls 92.

Should the temperature of the element 62 decrease, the fusible material will pass from a liquid to a solid state and allow movement of the seat 70 and stem 76 to the right under the bias of the spring 72. The balls 92 will then move back into engagement with the section 84 of the stem 76 under the combined action of the biasing forces of the spring 34 and snap-action mechanism 44 and the wedge effect of the discs 56, 73.

Although a preferred embodiment of this invention has been shown and described herein, it is to be understood that the invention is not limited to the details of construction and arrangement of parts disclosed but is to be interpreted as claimed.

It is claimed and desired to secure by Letters Patent:

1. In a thrust transmitting device, a first member having a plurality of successively reduced body portions defining a longitudinal axis and movable axially along said longitudinal axis, a second member adapted for axial movement on an axis coaxial with said longitudinal axis of said first member, a plurality of elements having inclined surfaces positioned between said first member and said second member, one of said elements being in operative engagement with said second member, a tapered surface on the periphery of said first member intermediate the ends thereof linking two of said successively reduced body portions, and means operatively associated with said inclined surfaces and said first member to have a wedge effect on said surfaces for causing movement of said second member in response to movement of said first member, said tapered surface engaging said means and imparting movement thereto only during a predetermined range of movement of said first member whereby said first member is capable of movement beyond said predetermined range without imparting movement to said means.

2. In a thermostatic control device, a casing having an inlet and outlet for fluid fuel, a valve member within said casing for controlling the flow of fluid between said inlet and outlet, thermally responsive means for actuating said valve member, said thermally responsive means including a member having a plurality of successively reduced body portions defining a longitudinal axis and movable axially along said axis in response to temperature variations, a tapered surface on the periphery of said member intermediate the ends thereof peripherally linking a pair of said successively reduced body portions, a first element having an inclined surface fixed to said casing, a second element having an inclined surface which faces said first mentioned inclined surface, said second element being biased toward said first member and operatively connected to said valve member for causing movement thereof, and slidable means positioned between said inclined surfaces and in operative engagement therewith, said slidable means being biased into engagement with said member and said tapered surface and adapted to be moved radially from said longitudinal axis of said member only by said tapered surface upon a predetermined axial range of movement of said member whereby said member is capable of movement beyond said predetermined range of movement without imparting movement to radially slidable means, said slidable means being adapted to have a wedge effect upon said inclined surfaces to cause separation of said first and second elements and movement of said second element.

References Cited in the file of this patent

UNITED STATES PATENTS

| 1,476,377 | Sieberlist | Dec. 4, 1923 |
| 2,236,908 | Jackson | Apr. 1, 1941 |
| 2,319,231 | Hawley | May 18, 1943 |
| 2,766,631 | Van Sittert | Oct. 16, 1956 |

FOREIGN PATENTS

| 293,810 | Great Britain | July 11, 1928 |